B. C. BATCHELLER.
TRANSIT TUBING FOR CARRIER SYSTEMS.
APPLICATION FILED FEB. 20, 1912.
1,061,035.
Patented May 6, 1913.
2 SHEETS—SHEET 1.
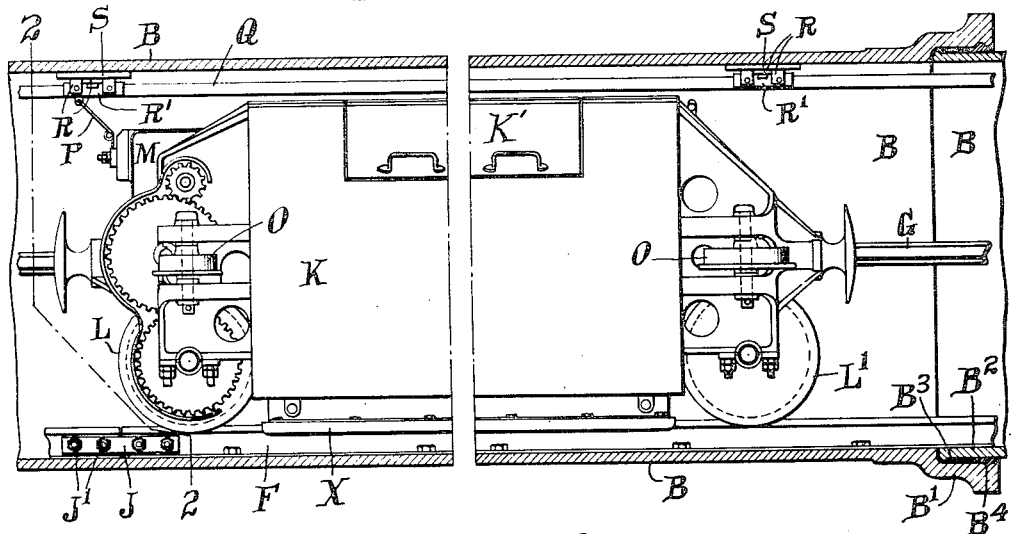
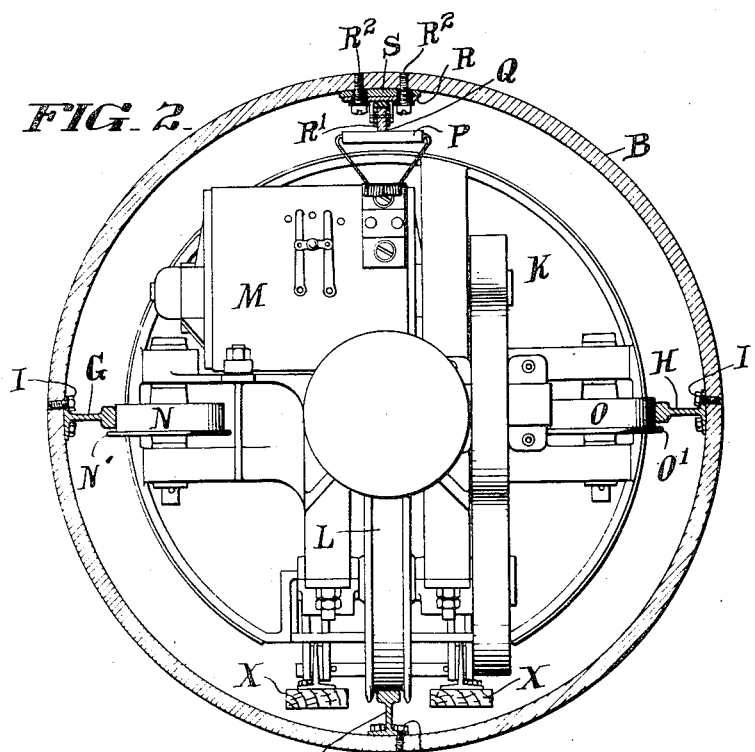

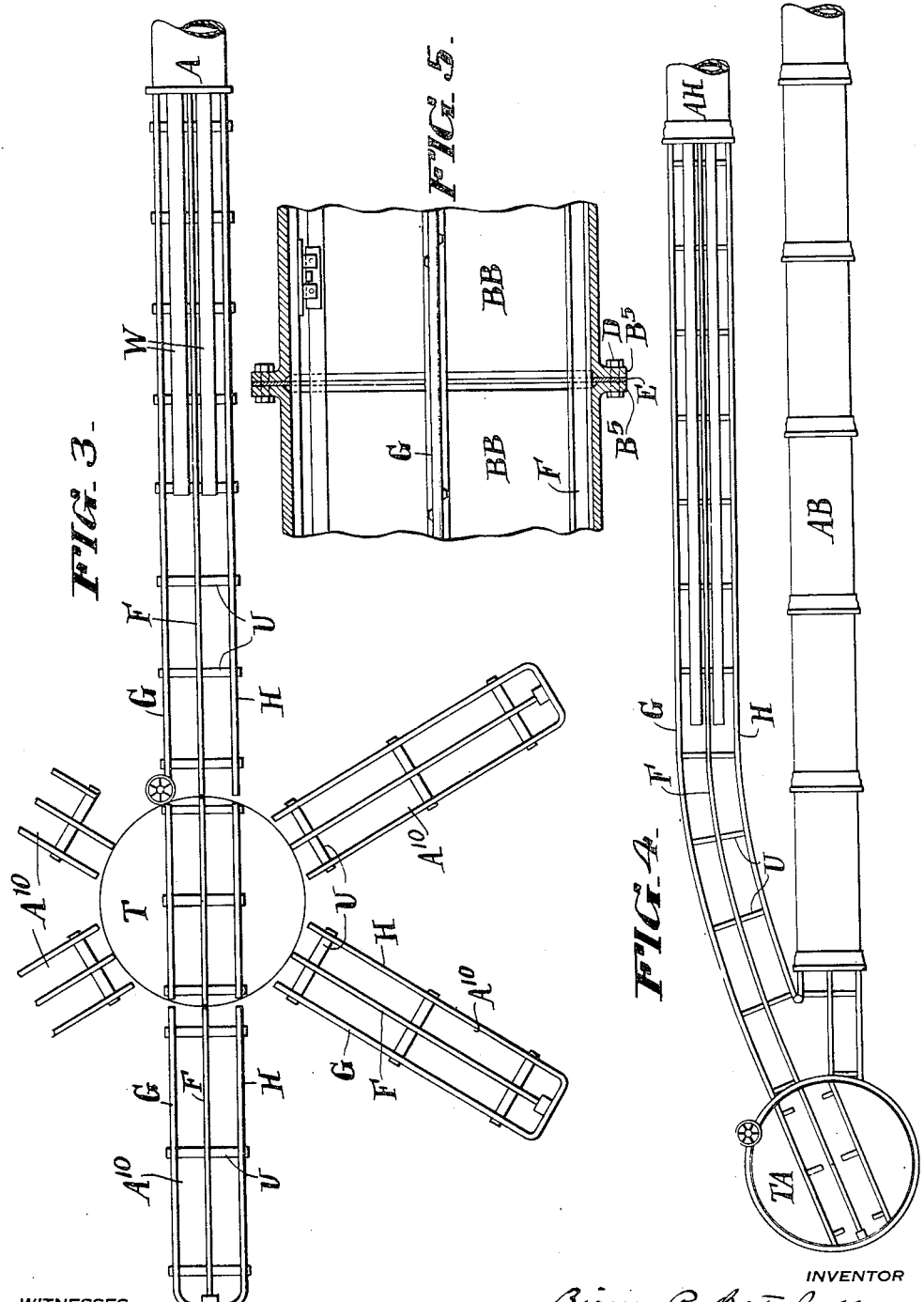

UNITED STATES PATENT OFFICE.

BIRNEY C. BATCHELLER, OF NEW YORK, N. Y.

TRANSIT-TUBING FOR CARRIER SYSTEMS.

1,061,035.  Specification of Letters Patent.  Patented May 6, 1913.

Application filed February 20, 1912. Serial No. 678,892.

*To all whom it may concern:*

Be it known that I, BIRNEY C. BATCHELLER, a citizen of the United States of America, residing in the city of New York, borough of Brooklyn, and State of New York, have invented a certain new and useful Improvement in Transit-Tubing for Carrier Systems, of which the following is a true and exact description, reference being had to the accompanying drawings, which form a part thereof.

My present invention relates to transit tubing of the kind employed in despatch tube or carrier systems in which wheeled carriers are employed which may be self-propelled, as by electric motors mounted on the carriers, and supplied with current from storage batteries also mounted on the carriers, or through a traveling contact with a charged conductor.

The primary object of my invention is to provide a simple and reliable tubing construction which may be cheaply and rapidly installed and is suitable for underground use and may readily be made water-tight, and which has smooth and stable guide ways for the wheels of the carriers passing through it.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described forms in which my invention may be embodied.

Figure 1 is a sectional elevation of a portion of a transit tube constructed in accordance with my present invention with a carrier in place therein. Fig. 2 is a transverse section of the tubing shown in Fig. 1 with the carrier shown in end elevation. Fig. 3 is a somewhat diagrammatic representation of a terminal station for a single track carrier system. Fig. 4 is a somewhat diagrammatic representation of a portion of a double track system and terminal station and, Fig. 5 is a partial sectional elevation taken similarly to Fig. 1 but showing a modified transit tube construction.

In the construction shown best in Figs. 1 and 2 the tubing A is formed of sections B of metal pipe, such as ordinary cast metal water or sewer pipe, these sections being so connected as to provide water-tight joints. As shown in Figs. 1 and 2, the sections are formed with matching bell and spigot ends B' and B² respectively which nest together and are calked with yarn B³ and lead B⁴ in the usual manner of making such pipes water-tight. In the modification shown in Fig. 5, the pipe sections B are provided with flanges B⁵ at their ends connected together by bolts D, E, representing a suitable gasket interposed between adjacent flanges B⁵ for insuring a tight joint. The carrier supporting and guiding track rails of which there are three, F, G and H in the particular construction illustrated are secured to the interior of the transit tubing. As shown these rails are substantially similar in cross-section to ordinary railroad track rails. The rails F, G and H may be made in sections of any convenient length and alined sections may be connected together by fishplates J of usual form and securing bolts J'. Preferably the joints in the rails are arranged not to come at the joints between the pipe sections B. The base flanges of the rails are preferably rounded as shown to fit against the curved wall of the tubing.

The rail F is secured to the bottom of the transit tubing and the rails G H are secured to the transit tubing at opposite sides and about midway between the top and the bottom of the tube. As shown the track rails are secured to the pipe sections B by bolts I passing through the base flanges of the rails and tapped into the pipe sections B. Where the internal diameter of the tubing is sufficiently large, as will ordinarily be the case, to permit a man to pass through and work in the tubing, the heads of the bolts I are preferably on the inside of the tubing as shown, but where the tube is too small for this the bolt heads may be on the outer side of the tubing.

A preferred form of carrier which I have devised to work in tubing of the character described is shown by the drawings and comprises a body K provided with a pair of main supporting wheels L and L' arranged in tandem at opposite ends of the carrier, and one, L, geared to the propelling electric motor M carried by the car. The wheels L and L' are provided with flanges at each side and run on the rail F. At each end of the carrier the latter is provided with an opposed pair of horizontal guide wheels N and O bearing against the guide rails G and H, respectively. The wheels N and O are preferably provided with bottom flanges N' and O' respectively.

The carrier as shown is provided with a traveling contact member P adapted to engage with an overhead conductor Q secured to, but insulated from the transit tubing at the top. As shown the conductor Q is secured to supporting metal clips R but insulated therefrom by the insulation R' and the clips R are insulated from the pipe sections B by blocks S of wood or other insulating material, and are secured to the pipe sections by bolts $R^2$ tapped into the latter.

In the single track system and terminal station shown in Fig. 3, a turn-table T is provided in front of, and at some distance from the mouth of the transit tubing A proper, but the track rails F, G and H are continued to the turn-table being supported between it and the transit tubing proper on brackets U. The turn-table, and storage tracks $A^{10}$, radially disposed with respect thereto, are each provided with rail sections F, G and H supported on brackets U and similar in their relative arrangement to rails F, G and H of the main track. Between the transit tube proper and the turn-table, stationary skids W are located which coöperate with skids X mounted on the carrier to frictionally check the carrier as it approaches the turn-table. The open arrangement of the track rails F, G and H where mounted on the supports U at the stations of the system facilitate the manipulation, including loading and unloading of the carriers at the stations. In the carriers shown, the body K is formed with a hinged door K' which may be opened to load and unload the carriers.

In the double track system of Fig. 4, the incoming transit tubing proper A A terminates short of the turn-table T A but its rails F, G and H are continued thereto on brackets U as in Fig. 3. The out-going tubing A B, however, extends directly to the turn-table T A.

While the carrier construction disclosed, and the relative arrangement of the rails F, G and H with respect to each other and the supporting and guide wheels of the carriers, and the provisions disclosed for frictionally checking the carrier embody various features novel with me, they are not claimed herein, but are claimed in my co-pending applications, Serial No. 728,775 filed October 31, 1912, and 678,893 filed February 20, 1912.

It will be readily apparent to those skilled in the art that the transit tubing disclosed and claimed herein is simple and durable and comparatively inexpensive to manufacture and install and can be readily and rapidly installed. When used underground, as will ordinarily be the case, the tight joints between the pipe sections will insure a desirable dryness in the tubing. The track rails F, G and H provide the desired smooth guideways for the carrier wheels and are secured in place, and in effect, ballasted in a desirable manner by their anchorage to the pipe sections B forming the transit tubing.

The character of the transit tubing provided makes it readily feasible to make the tubing with the sharp bends found desirable in actual practice and to insure the smoothness, rigidity and strength of track rails necessary to permit the carriers to take the sharp curves at high speed.

While in accordance with the provisions of the statutes I have illustrated and described the best forms of my invention now known to me, it will be apparent to those skilled in the art that changes may be made in the form of the apparatus disclosed without departing from the spirit of my invention, and that under some conditions, certain features of my invention may be used with advantage without a corresponding use of other features.

Having now described my invention what I claim as new and desire to secure by Letters Patent, is:

1. In a transit system of the character described a sub-surface transit tubing for wheeled carriers formed of integral lengths of metal pipe jointed together and having carrier track rails extending longitudinally of the tubing and secured to said pipe.

2. In a transit system of the character described a sub-surface transit tubing for wheeled carriers formed of integral lengths of metal pipe jointed together and having carrier track rails extending longitudinally of the tubing and secured to said pipe, and formed in sections which break joints with said pipe lengths.

3. In a transit system of the character described a sub-surface transit tubing for wheeled carriers formed of cast metal pipe sections connected by calked bell and spigot joints and having carrier track rails extending longitudinally of the tubing and bolted to the pipe sections.

4. In a transit system of the character described, a guide way for wheeled carriers comprising a sub-surface transit tubing formed of lengths of metal pipe jointed together, and track rails running through said tubing and secured to said pipe and projecting out of the tubing at one end thereof to provide an open terminal portion and supports for the projecting track rail ends.

5. In a transit system of the character described a sub-surface transit tubing for wheeled carriers formed of integral lengths of cast metal pipe jointed together, and a track therein formed of three rails secured to said pipe sections.

BIRNEY C. BATCHELLER.

Witnesses:
HENRY SCHOMBER,
ROBERT S. SLOAN.